(35.)
John Knapp's Improvement for Preserving Eggs.
No. 122,258.  Patented Dec. 26, 1871.
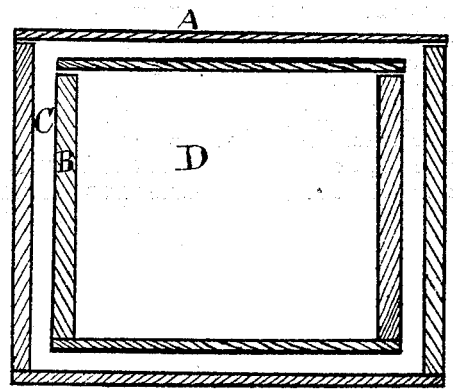
John Knapp  Inventor.
John L. Lewis  } Witnesses.
Charles Ketchum

UNITED STATES PATENT OFFICE

JOHN KNAPP, OF PRATTSBURG, NEW YORK.

IMPROVEMENT IN PRESERVING EGGS.

Specification forming part of Letters Patent No. 122,258, dated December 26, 1871.

I, JOHN KNAPP, of Prattsburg, in the county of Steuben and State of New York, have invented certain Improvements for Preserving Eggs, of which the following is a specification:

My invention relates to the method of preserving eggs by putting them in a vessel of any size, shape, or material, and any dry material with them, and inclosing the vessel in a similar-shaped vessel large enough to contain it and have the necessary amount of space between them, and filling the space with the sulphate of lime.

The figure is a vertical section.

A is the outer box that is made to contain the inner box, and is made enough larger than the inner one to have sufficient space between them on all sides. They may be made any shape or size required. B is the inner box. It must be made in shape like the outer box, and as much smaller as will allow the proper amount of space between them. The cover may be held with hinges if preferred. C is the cavity or space between the boxes. It may be any size required, and should surround the inner box on all sides. This space is to be filled with sulphate of lime, or other equivalent, so as to completely surround the inner box B for the purpose of excluding the eggs from heat, light, and air. The inner box D is first embedded in or surrounded by plaster of Paris. It is then filled with the layers of eggs and bran, or its equivalent, in the usual manner of packing eggs for transportation. The lid of the inner box is then put in position, and the space between it and the lid of the outer box is filled with the plaster of Paris, which completes the incasing of the box D in its hermetical coat of plaster Paris.

What I claim as my invention is—

The combination of the inner box D, its surrounding coating of plaster Paris C, and the outer box A for the packing and preserving of eggs, as specified.

JOHN KNAPP.

Witnesses:
JOHN L. LEWIS,
CHARLES KETCHUM. (116)